US012608844B2

(12) United States Patent
Tsutsumi

(10) Patent No.: US 12,608,844 B2
(45) Date of Patent: Apr. 21, 2026

(54) VEHICLE

(71) Applicant: HONDA MOTOR CO., LTD., Tokyo (JP)

(72) Inventor: Hiro Tsutsumi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 18/797,668

(22) Filed: Aug. 8, 2024

(65) Prior Publication Data

US 2026/0057549 A1    Feb. 26, 2026

(51) Int. Cl.
| | |
|---|---|
| *G06T 7/80* | (2017.01) |
| *B60W 10/22* | (2006.01) |
| *G06T 7/73* | (2017.01) |
| *G06V 20/56* | (2022.01) |

(52) U.S. Cl.
CPC .............. *G06T 7/80* (2017.01); *B60W 10/22* (2013.01); *G06T 7/74* (2017.01); *G06V 20/588* (2022.01)

(58) Field of Classification Search
CPC . G06T 7/80; G06T 7/74; B60W 10/22; G06V 20/588

USPC .......................................................... 701/37
See application file for complete search history.

(56) References Cited

U.S. PATENT DOCUMENTS

| | | | |
|---|---|---|---|
| 2019/0078876 A1 | 3/2019 | Ouchida et al. | |
| 2020/0105017 A1* | 4/2020 | Gu ............................ | G06T 7/80 |

FOREIGN PATENT DOCUMENTS

| | | | | |
|---|---|---|---|---|
| CN | 114403114 B | * 11/2022 | ........... | G05D 1/0246 |
| CN | 119749517 A | * 4/2025 | ........... | B60W 30/02 |
| JP | 2013147114 A | * 8/2013 | ............... | G06T 1/00 |
| JP | 2016166885 A | * 9/2016 | ............. | G01B 11/26 |

* cited by examiner

*Primary Examiner* — Hai H Huynh
(74) *Attorney, Agent, or Firm* — Armstrong Teasdale LLP

(57) ABSTRACT

A vehicle includes a posture adjustment device connected to a wheel and configured to change a posture of a vehicle body relative to a road surface, an imaging device attached to the vehicle body and configured to capture an image of an external environment, and a controller configured to control the posture adjustment device and the imaging device. The controller is configured to determine whether a posture of the imaging device has changed, and correct the posture of the imaging device by causing the posture adjustment device to change the posture of the vehicle body in a case where the posture of the imaging device has changed.

9 Claims, 9 Drawing Sheets

*Fig.4* start

ST1   acquire camera image

ST2   acquire current position of camera vanishing point

ST3   posture of front camera changed?   Yes

No

ST4   image processing area fall within imaging range?   Yes

No

ST5   camera image processing

ST6   posture correction processing end

_Fig.7A_
_Fig.7B_
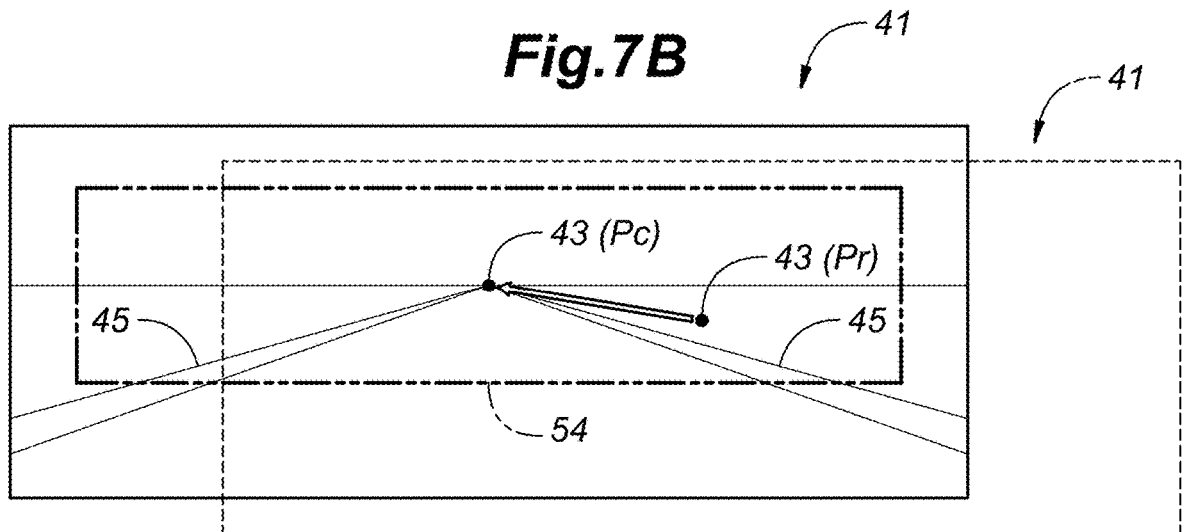

VEHICLE

TECHNICAL FIELD

The present invention relates to a vehicle including an imaging device configured to capture an image of an external environment.

BACKGROUND ART

In recent years, there has been an increase in efforts to give consideration to vulnerable people among transport participants and provide them with access to sustainable transport systems. To this end, research and development to further improve traffic safety and convenience through the development of driving assistance technologies is attracting attention. For example, there is a known vehicle configured to recognize an object using an image captured by an imaging device such as a camera, and to provide driving assistance based on the recognition result of the object.

As an example of an imaging device, US2019/0078876A1 discloses a stereo camera that captures an image of a road surface in front of a vehicle.

When a posture of an imaging device changes due to the aging thereof, the external impact, and the like, an angle of an optical axis of the imaging device may deviate. If an object is recognized using an image captured by the imaging device in a state where such a deviation in the angle of the optical axis occurs, the detection accuracy of a distance from the imaging device to the object may decrease or the range in which the object can be detected may become narrower, which may cause a decrease in the recognition performance of the object.

SUMMARY OF THE INVENTION

In view of the above background, an object of the present invention is to improve the recognition performance of an object by correcting a posture of an imaging device in a case where the posture of the imaging device has changed, and to contribute to the development of a sustainable transportation system accordingly.

To achieve such an object, one aspect of the present invention provides a vehicle (1) comprising: a posture adjustment device (5) connected to a wheel (3F and 3R) and configured to change a posture of a vehicle body (2) relative to a road surface; an imaging device (8) attached to the vehicle body and configured to capture an image (41) of an external environment; and a controller (17) configured to control the posture adjustment device and the imaging device, wherein the controller is configured to determine whether a posture of the imaging device has changed, and correct the posture of the imaging device by causing the posture adjustment device to change the posture of the vehicle body in a case where the posture of the imaging device has changed.

According to this aspect, in a case where the posture of the imaging device has changed, it is possible to correct a deviation of an angle of an optical axis (hereinafter referred to as "the optical axis angle") of the imaging device by correcting the posture of the imaging device. Accordingly, in a case where an object is recognized using the image captured by the imaging device, it is possible to improve the recognition performance of the object.

In the above aspect, preferably, the controller is configured to acquire a current position (Pc) of a vanishing point (43) in the image captured by the imaging device, and correct the posture of the imaging device by causing the posture adjustment device to change the posture of the vehicle body in a case where the posture of the imaging device has changed and an image processing area (54) around the current position of the vanishing point does not fall within an imaging range of the imaging device.

According to this aspect, in a case where the posture of the imaging device has changed significantly and the optical axis angle of the imaging device has deviated significantly such that the image processing area does not fall within the imaging range, it is possible to correct the significant deviation in the optical axis angle of the imaging device by changing the posture of the vehicle body.

In the above aspect, preferably, the controller is configured to correct a position of the vanishing point by executing image processing on the image captured by the imaging device in a case where the posture of the imaging device has changed and the image processing area falls within the imaging range of the imaging device.

According to this aspect, in a case where the posture of the imaging device has changed slightly and the optical axis angle of the imaging device has deviated slightly such that the image processing area falls within the imaging range, it is possible to correct the deviation of the optical axis angle of the imaging device by the image processing without changing the posture of the vehicle body. Accordingly, it is possible to reduce the frequency of changing the posture of the vehicle body for correcting the deviation of the optical axis angle of the imaging device.

In the above aspect, preferably, the controller is configured to correct the posture of the imaging device by causing the posture adjustment device to change the posture of the vehicle body in a case where the posture of the imaging device has changed and a changing amount of the posture of the imaging device is equal to or greater than a first threshold.

According to this aspect, in a case where the posture of the imaging device has changed relatively significantly and the optical axis angle of the imaging device has deviated relatively significantly, it is possible to correct the relatively significant deviation of the optical axis angle of the imaging device by changing the posture of the vehicle body.

In the above aspect, preferably, the controller is configured to correct a position of a vanishing point (43) in the image captured by the imaging device by executing image processing on the image captured by the imaging device in a case where the posture of the imaging device has changed and the changing amount of the posture of the imaging device is less than the first threshold.

According to this aspect, in a case where the posture of the imaging device has changed relatively slightly and the optical axis angle of the imaging device has deviated relatively slightly, it is possible to correct the deviation of the optical axis angle of the imaging device by the image processing without changing the posture of the vehicle body. Accordingly, it is possible to reduce the frequency of changing the posture of the vehicle body for correcting the deviation of the optical axis angle of the imaging device.

In the above aspect, preferably, the vehicle further comprises an output device (14) configured to output information to an occupant, wherein the controller is configured to cause the output device to output warning information in a case where the posture of the imaging device has changed and the changing amount of the posture of the imaging device is equal to or greater than a second threshold that is greater than the first threshold.

According to this aspect, in a case where the posture of the imaging device has changed significantly and the optical axis angle of the imaging device has deviated significantly, it is possible to draw the occupant's attention by outputting the warning information to the occupant.

In the above aspect, preferably, the controller is configured to perform a plurality of driving assistance functions based on the image captured by the imaging device, allow performance of all of the driving assistance functions in a case where the posture of the imaging device has changed and the changing amount of the posture of the imaging device is less than the first threshold, prohibit performance of a part of the driving assistance functions in a case where the posture of the imaging device has changed and the changing amount of the posture of the imaging device is equal to or greater than the first threshold and less than the second threshold, and prohibit performance of all of the driving assistance functions in a case where the posture of the imaging device has changed and the changing amount of the posture of the imaging device is equal to or greater than the second threshold.

According to this aspect, it is possible to enhance the restrictions on the driving assistance functions as the changing amount of the posture of the imaging device increases.

In the above aspect, preferably, the controller is configured to store a reference position (Pr) of a vanishing point (43) in the image captured by the imaging device, acquire a current position (Pc) of the vanishing point in the image captured by the imaging device, and determine that the posture of the imaging device has changed in a case where the current position of the vanishing point does not match the reference position of the vanishing point.

According to this aspect, it is possible to accurately determine whether the posture of the imaging device has changed based on the current position of the vanishing point and the reference position of the vanishing point.

In the above aspect, preferably, the controller is configured to store a reference position (Pr) of a vanishing point (43) in the image captured by the imaging device, acquire a current position (Pc) of the vanishing point in the image captured by the imaging device, and estimate a changing amount and a changing direction of the posture of the imaging device based on the reference position of the vanishing point and the current position of the vanishing point.

According to this aspect, it is possible to accurately estimate the changing amount and the changing direction of the posture of the imaging device based on the current position of the vanishing point and the reference position of the vanishing point.

In the above aspect, preferably, the posture adjustment device is a suspension (5) arranged between the wheel and the vehicle body, and the suspension is configured to change the posture of the vehicle body by raising and lowering a portion of the vehicle body relative to the wheel.

According to this aspect, it is possible to change the posture of the vehicle body using a simple structure.

Thus, according to the above aspects, it is possible to improve the recognition performance of an object by correcting a posture of an imaging device in a case where the posture of the imaging device has changed.

BRIEF DESCRIPTION OF THE DRAWING(S)

FIG. 4 is an explanatory diagram showing an image processing area around a reference position of a camera vanishing point;

FIG. 7A is an explanatory diagram showing camera image processing according to the first embodiment;

FIG. 7B is an explanatory diagram showing posture correction processing according to the first embodiment;

DETAILED DESCRIPTION OF THE INVENTION

First Embodiment

<Vehicle 1>

Figure 1:
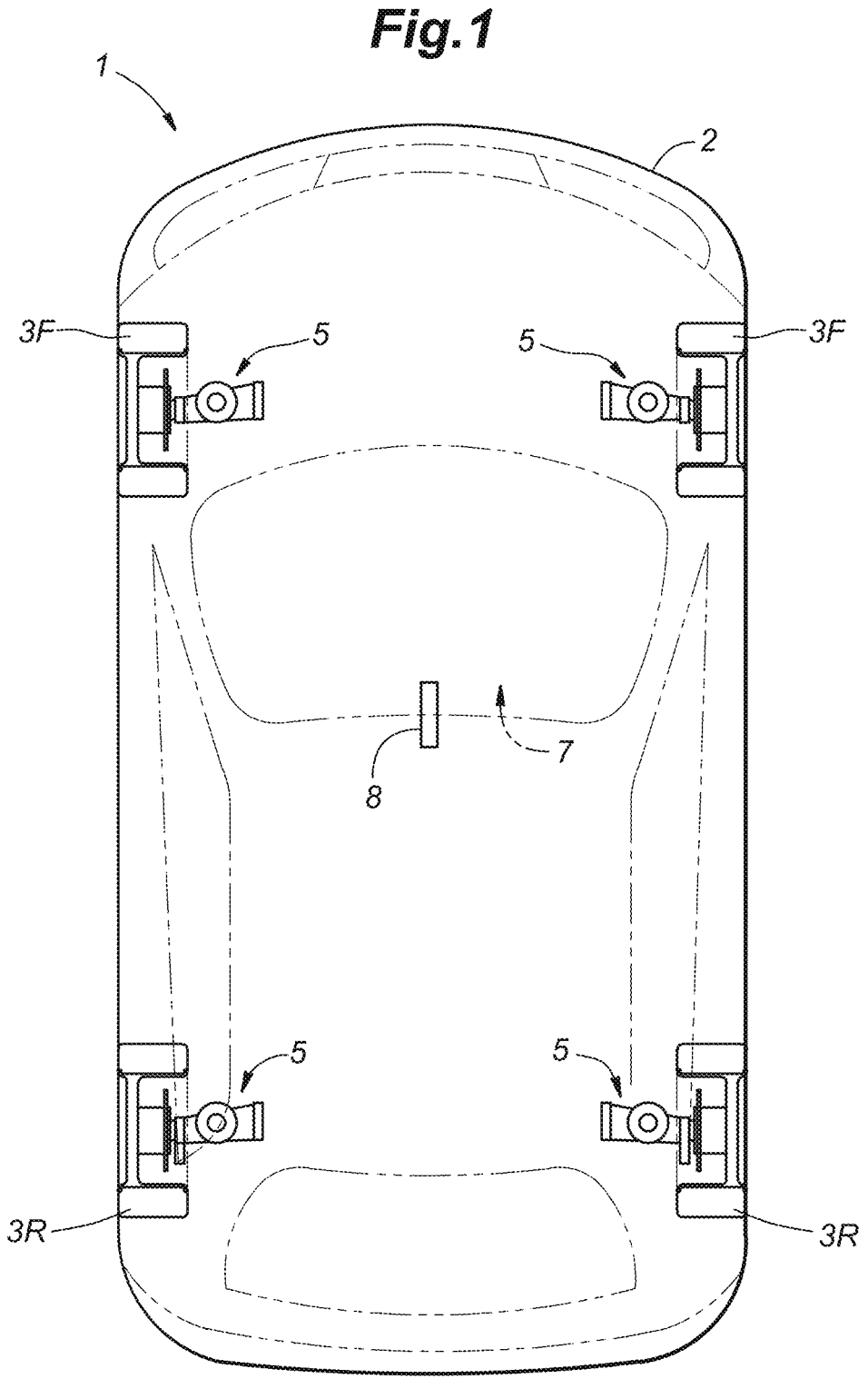
FIG. 1 is a plan view showing a vehicle according to the first embodiment.

Hereinafter, a vehicle 1 according to the first embodiment of the present invention will be described with reference to FIGS. 1 to 8. With reference to FIG. 1, the vehicle 1 is, for example, an off-road automobile. The vehicle 1 includes a vehicle body 2 elongated in the front-and-rear direction. Under the vehicle body 2, four wheels 3F and 3R are arranged. The four wheels 3F and 3R include left and right front wheels 3F and left and right rear wheels 3R.

Four suspensions 5 (an example of a posture adjustment device) are connected to the four wheels 3F and 3R. Each suspension 5 (hereinafter simply referred to as "the suspension 5") is arranged between the corresponding wheel 3F and 3R and the vehicle body 2.

The suspension 5 is composed of, for example, an air suspension. The suspension 5 includes an air chamber that stores compressed air, and a compressor that supplies the compressed air to the air chamber. When the pressure of the compressed air in the air chamber increases, the stroke of the suspension 5 increases, and a portion (a portion corresponding to the suspension 5 the stroke of which has increased) of the vehicle body 2 is raised relative to the wheels 3F and 3R. When the pressure of the compressed air in the air chamber decreases, the stroke of the suspension 5 decreases, and a portion (a portion corresponding to the suspension 5 the stroke of which has been decreased) of the vehicle body 2 is lowered relative to the wheels 3F and 3R. In this way, a portion of the vehicle body 2 is raised and lowered relative to the wheels 3F and 3R, and a posture of the vehicle body 2 relative to a road surface changes accordingly.

A front window 7 is attached to a front portion of the vehicle body 2. A front camera 8 (an example of an imaging device) is attached to an inner surface of the front window 7. That is, the front camera 8 is attached to the front portion of the vehicle body 2 via the front window 7. Accordingly, when the posture of the vehicle body 2 relative to the road surface changes, a posture of the front camera 8 relative to the road surface also changes.

The front camera 8 captures an image of an external environment of the vehicle 1 through the front window 7. The front camera 8 includes a lens that converges light coming from the front through the front window 7, and an image sensor that converts the light converged by the lens into an electrical signal. The image sensor is composed of a solid-state image sensing device such as a CCD or a CMOS.

Figure 2:
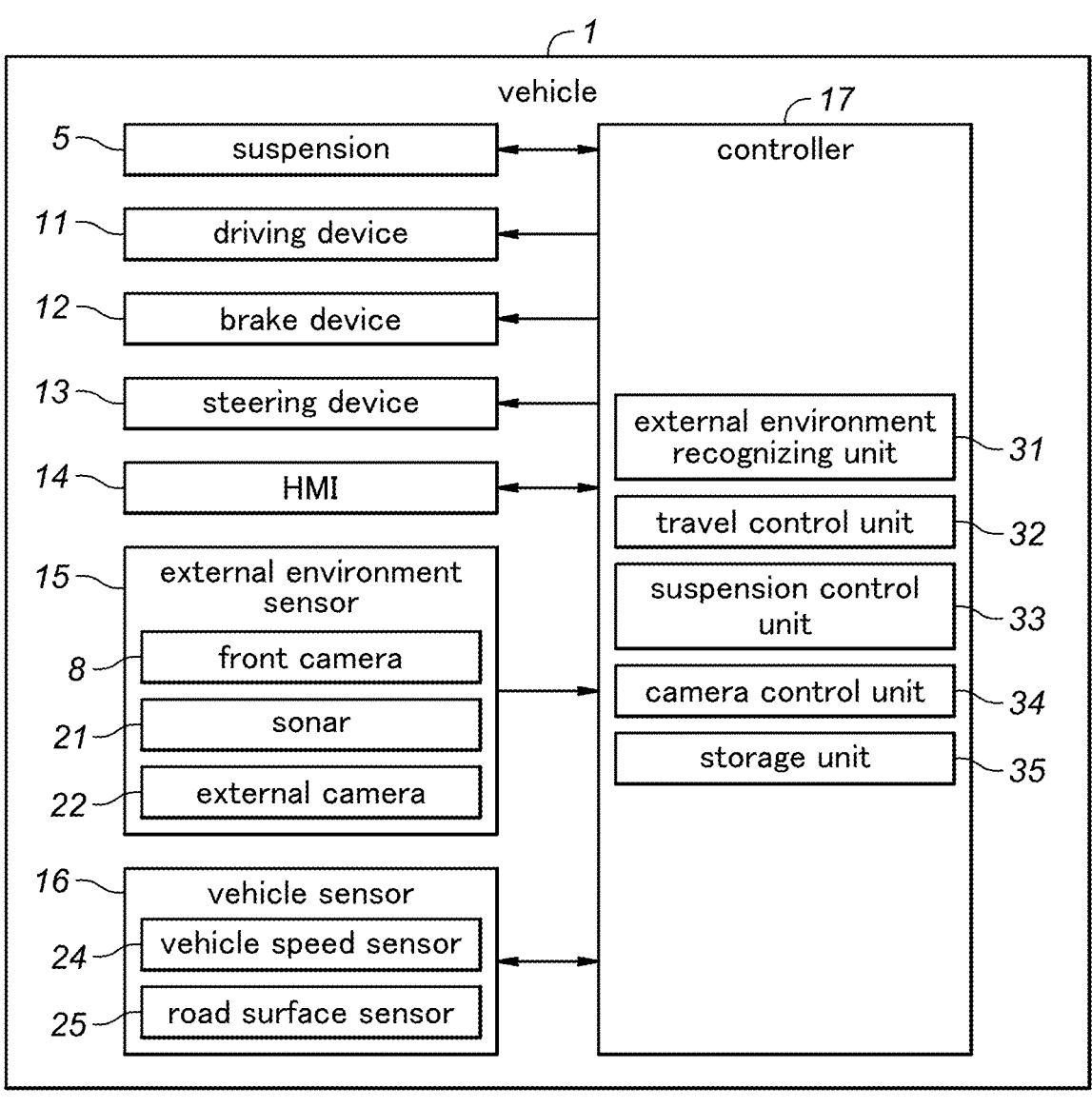
FIG. 2 is a block diagram showing the vehicle according to the first embodiment.

With reference to FIG. 2, the vehicle 1 includes the above-mentioned suspension 5, a driving device 11, a brake device 12, a steering device 13, a Human Machine Interface 14 (HMI; an example of an output device), an external environment sensor 15, a vehicle sensor 16, and a controller 17.

The driving device 11 is a device that applies a driving force to the vehicle 1. The driving device 11 includes a driving source composed of an electric motor and/or an internal combustion engine. The driving device 11 rotates the wheels 3F and 3R by the driving source, thereby generating the driving force for causing the vehicle 1 to travel.

The brake device 12 is a device that applies a brake force to the vehicle 1. The brake device 12 includes, for example, a brake caliper that presses a pad against a brake rotor, and an electric cylinder that supplies hydraulic pressure to the brake caliper.

The steering device 13 is a device that changes a steering angle of the left and right front wheels 3F. The steering device 13 includes, for example, a rack-and-pinion mechanism that steers the left and right front wheels 3F, and an electric motor that drives the rack-and-pinion mechanism.

The HMI 14 is a device that outputs information to an occupant and accepts an input operation by the occupant. The HMI 14 includes, for example, a touch panel and a sound generation device.

The external environment sensor 15 is a sensor that detects an object (for example, an obstacle or a delimiting line on a travel route of the vehicle 1) that exists in an external environment of the vehicle 1. The external environment sensor 15 includes, for example, the above-mentioned front camera 8, a sonar 21, and an external camera 22.

The vehicle sensor 16 is a sensor that detects a traveling state and the like of the vehicle 1. The vehicle sensor 16 includes a vehicle speed sensor 24 that detects a vehicle speed, and a road surface sensor 25 that detects a condition of the road surface (for example, a friction coefficient of the road surface).

The controller 17 is an electronic control unit (ECU) composed of a computer configured to execute various kinds of processing. The controller 17 includes an arithmetic operation device (a processor such as a CPU and an MPU), and a storage device (memory such as a ROM and a RAM). The arithmetic operation device is programmed to read necessary data and application software from the storage device and to execute a prescribed arithmetic operation according to the application software. The controller 17 may be configured as a single piece of hardware, or may be configured as a unit composed of plural pieces of hardware. The controller 17 is connected to each component of the vehicle 1 via a communication network such as a controller area network (CAN), and controls each component of the vehicle 1.

The controller 17 includes, as functional units thereof, an external environment recognizing unit 31, a travel control unit 32, a suspension control unit 33, a camera control unit 34, and a storage unit 35. At least a portion of each functional unit of the controller 17 may be realized by hardware such as an LSI, an ASIC, or an FPGA, or may be realized by a combination of software and hardware.

The external environment recognizing unit 31 of the controller 17 recognizes a position of the object (for example, the obstacle or the delimiting line on the travel route of the vehicle 1) that exists in the external environment of the vehicle 1 based on the detection result of the external environment sensor 15. For example, the external environment recognizing unit 31 recognizes the position of the object that exists in front of the vehicle 1 based on the image captured by the front camera 8.

The travel control unit 32 of the controller 17 performs a plurality of driving assistance functions based on the position of the object (for example, the obstacle or the delimiting line on the travel route of the vehicle 1) recognized by the external environment recognizing unit 31. For example, the plurality of driving assistance functions includes a lane changing function. When the lane changing function is being performed, the travel control unit 32 controls the driving device 11, the brake device 12, and the steering device 13 such that the vehicle 1 automatically changes lanes. The plurality of driving assistance functions may include, in addition to the lane changing function, a lane keeping function, a preceding vehicle following function, and the like.

The suspension control unit 33 of the controller 17 is connected to the suspension 5 and controls the suspension 5. For example, the suspension control unit 33 adjusts the stroke (height) of the suspension 5 to change the posture of the vehicle body 2 relative to the road surface.

The camera control unit 34 of the controller 17 is connected to the front camera 8 and controls the front camera 8. For example, the camera control unit 34 performs internal adjustment (calibration) of the front camera 8.

The storage unit 35 of the controller 17 is composed of memory, an HDD, and the like. The storage unit 35 stores programs, tables, and the like used for controlling the vehicle 1.

Hereinafter, for convenience of explanation, the functional units of the controller 17 will not be specified, and will simply be referred to as "the controller 17".

<Vanishing Point Acquisition Processing>

Next, the first to third examples of vanishing point acquisition processing executed by the controller 17 will be described. The vanishing point acquisition processing is processing for acquiring a vanishing point (hereinafter referred to as "the camera vanishing point 43") in the image (hereinafter referred to as "the camera image 41") captured by the front camera 8.

Figure 3A:
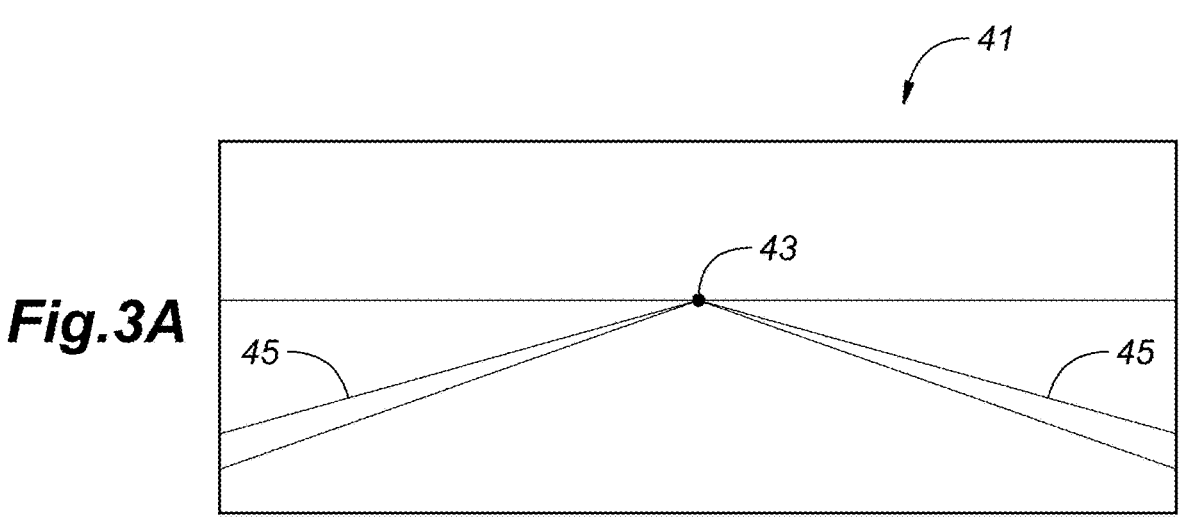
FIG. 3A is an explanatory diagram showing the first example of vanishing point acquisition processing according to the first embodiment.

With reference to FIG. 3A, in the first example of the vanishing point acquisition processing, the controller 17 detects positions of left and right white lines 45 from the camera image 41. Next, the controller 17 extends the left and right white lines 45 and acquires a point where the left and right white lines 45 coincide with each other as the camera vanishing point 43.

Figure 3B:
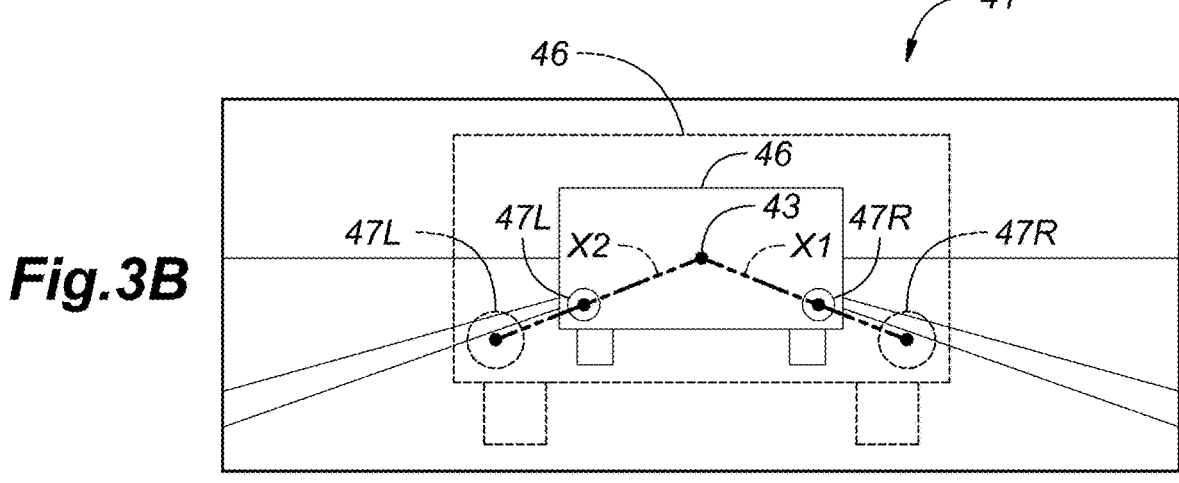
FIG. 3B is an explanatory diagram showing the second example of the vanishing point acquisition processing according to the first embodiment.

With reference to FIG. 3B, in the second example of the vanishing point acquisition processing, the controller 17 detects positions of left and right taillights 47L, 47R of a preceding vehicle 46 from a plurality of camera images 41 captured at different times. For example, the controller 17 detects the positions of the left and right taillights 47L, 47R of the preceding vehicle 46 from the camera image 41 captured at a first time, and detects the positions of the left and right taillights 47L, 47R of the preceding vehicle 46 from the camera image 41 captured at a second time that is later than the first time. Next, the controller 17 extends a straight line X1 passing through the center of the right taillight 47R of each camera image 41 and a straight line X2 passing through the center of the left taillight 47L of each camera image 41, and acquires a point where the straight lines X1 and X2 coincide with each other as the camera vanishing point 43.

Figure 3C:
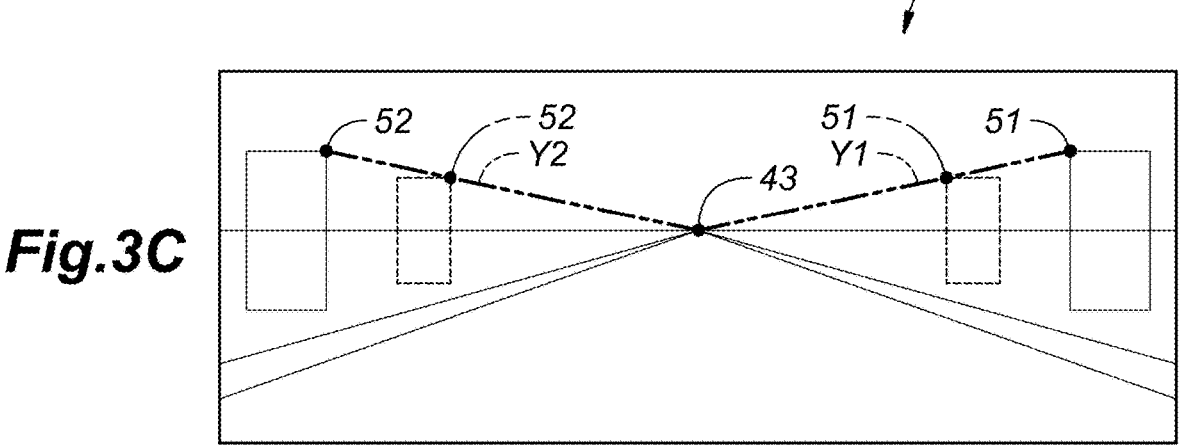
FIG. 3C is an explanatory diagram showing the third example of the vanishing point acquisition processing according to the first embodiment.

With reference to FIG. 3C, in the third example of the vanishing point acquisition processing, the controller 17 acquires the camera vanishing point 43 using the so-called "optical flow". More specifically, the controller 17 detects positions of a plurality of characteristic points from a plurality of camera images 41 captured at different times. For example, the controller 17 detects the positions of first and second characteristic points 51, 52 from the camera image 41 captured at a first time, and detects the positions of the first and second characteristic points 51, 52 from the camera image 41 captured at a second time that is later than the first time. Next, the controller 17 extends a straight line Y1 passing through the position of the first characteristic point 51 detected from each camera image 41 and a straight line Y2 passing through the position of the second characteristic point 52 detected from each camera image 41, and acquires a point where the straight lines Y1 and Y2 coincide with each other as the camera vanishing point 43.

<Camera Vanishing Point 43 and Image Processing Area 54>

Figure 4:
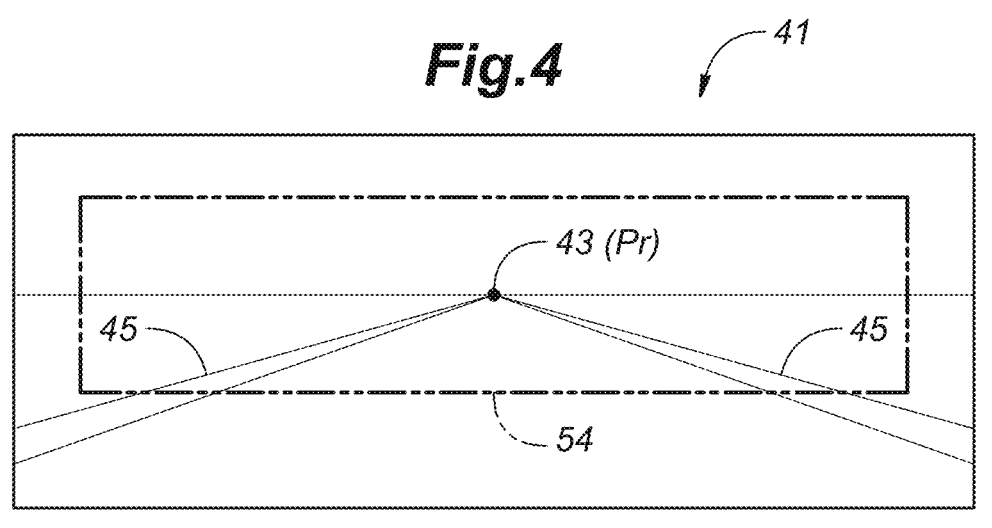

With reference to FIG. 4, upon acquiring the camera vanishing point 43 by the above-mentioned vanishing point acquisition processing, the controller 17 sets an image processing area 54 around (centered on) the camera vanishing point 43. The image processing area 54 is an area used by the controller 17 to recognize the object. In other words, the image processing area 54 is an area used by the controller 17 for the performance of the plurality of driving assistance functions.

In an initial state (for example, a state at the time of shipment) of the vehicle 1, the controller 17 acquires a reference position Pr of the camera vanishing point 43 by the above-mentioned vanishing point acquisition processing, and stores the acquired reference position Pr of the camera vanishing point 43. Upon acquiring the reference position Pr of the camera vanishing point 43, the controller 17 sets the image processing area 54 around the reference position Pr of the camera vanishing point 43, and stores the set image processing area 54.

<Optical Axis Angle Correction Control>

Next, optical axis angle correction control executed by the controller 17 will be described. The optical axis angle correction control is control for correcting a deviation in the angle of the optical axis of the front camera 8 (hereinafter referred to as "the camera optical axis angle"). It is assumed that at the start of the optical axis angle correction control, the position of the camera vanishing point 43 is set to the reference position Pr.

Figure 5:
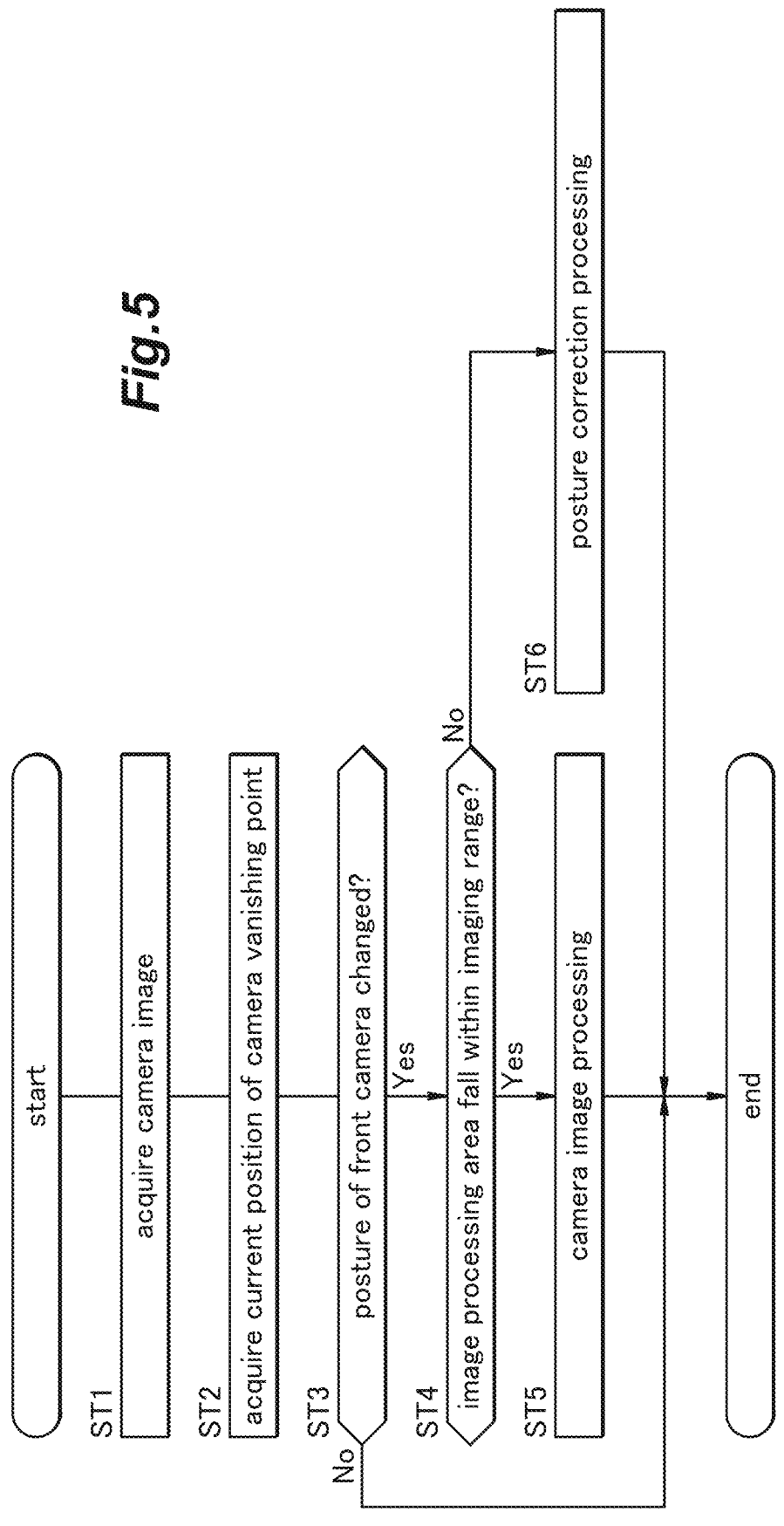
FIG. 5 is a flowchart showing optical axis angle correction control according to the first embodiment.

With reference to FIG. 5, when the optical axis angle correction control is started, the controller 17 causes the front camera 8 to capture the camera image 41, and acquires the camera image 41 from the front camera 8 (step ST1).

Next, the controller 17 acquires a current position Pc of the camera vanishing point 43 by executing the above-mentioned vanishing point acquisition processing on the camera image 41 (i.e., the current camera image 41) acquired in step ST1 (step ST2).

Next, the controller 17 determines whether the posture of the front camera 8 has changed from a reference posture (for example, a posture at the time of shipment) (step ST3). For example, in a case where the current position Pc of the camera vanishing point 43 matches the reference position Pr of the camera vanishing point 43, the controller 17 determines that the posture of the front camera 8 has not changed from the reference posture. By contrast, in a case where the current position Pc of the camera vanishing point 43 does not match the reference position Pr of the camera vanishing point 43, the controller 17 determines that the posture of the front camera 8 has changed from the reference posture.

In a case where the posture of the front camera 8 has not changed from the reference posture (step ST3: No), the controller 17 ends the optical axis angle correction control without correcting the camera optical axis angle.

Figures 6A, 6B:
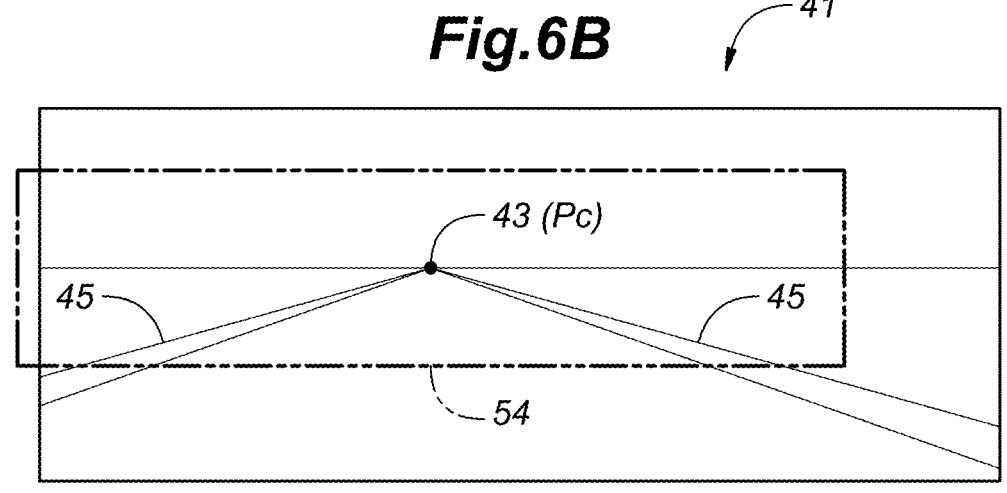
FIG. 6A is an explanatory diagram showing a case where the whole of the image processing area falls within a camera image.
FIG. 6B is an explanatory diagram showing a case where a portion of the image processing area sticks out of the camera image.

In a case where the posture of the front camera 8 has changed from the reference posture (step ST3: Yes), the controller 17 sets the image processing area 54 around (centered on) the current position Pc of the camera vanishing point 43 (hereinafter simply referred to as "the image processing area 54"), and determines whether the image processing area 54 falls within an imaging range of the front camera 8 (step ST4). With reference to FIG. 6A, in a case where the whole of the image processing area 54 falls within the camera image 41, the controller 17 determines that the image processing area 54 falls within the imaging range of the front camera 8. With reference to FIG. 6B, in a case where a portion of the image processing area 54 sticks out of the camera image 41, the controller 17 determines that the image processing area 54 does not fall within the imaging range of the front camera 8.

With reference to FIG. 5, in a case where the image processing area 54 falls within the imaging range of the front camera 8 (step ST4: Yes), the controller 17 executes camera image processing (step ST5). With reference to FIG. 7A, in the camera image processing, the controller 17 corrects the position of the camera vanishing point 43 from the reference position Pr to the current position Pc by executing image processing (correction processing) on the camera image 41. Accordingly, the deviation of the camera optical axis angle from a reference angle is corrected, and the camera optical axis angle matches the reference angle. The camera image processing is internal adjustment (calibration) of the front camera 8. Accordingly, even if the controller 17 executes the camera image processing, the posture of the front camera 8 is not corrected, and the position of the camera image 41 does not change.

With reference to FIG. 5, in a case where the image processing area 54 does not fall within the imaging range of the front camera 8 (step ST4: No), the controller 17 executes posture correction processing (step ST6). With reference to FIG. 7B, in the posture correction processing, the controller 17 corrects the posture of the front camera 8 by causing one or more suspensions 5 to change the posture of the vehicle body 2. Accordingly, the position of the camera image 41 changes, and the position of the camera vanishing point 43 is corrected from the reference position Pr to the current position Pc. Accordingly, the deviation of the camera optical axis angle from the reference angle is corrected, and the camera optical axis angle matches the reference angle.

When either the camera image processing (step ST5) or the posture correction processing (step ST6) ends, the optical axis angle correction control ends.

<Posture Correction Processing>

Next, the posture correction processing (step ST6) of the optical axis angle correction control will be further described.

Figure 8:
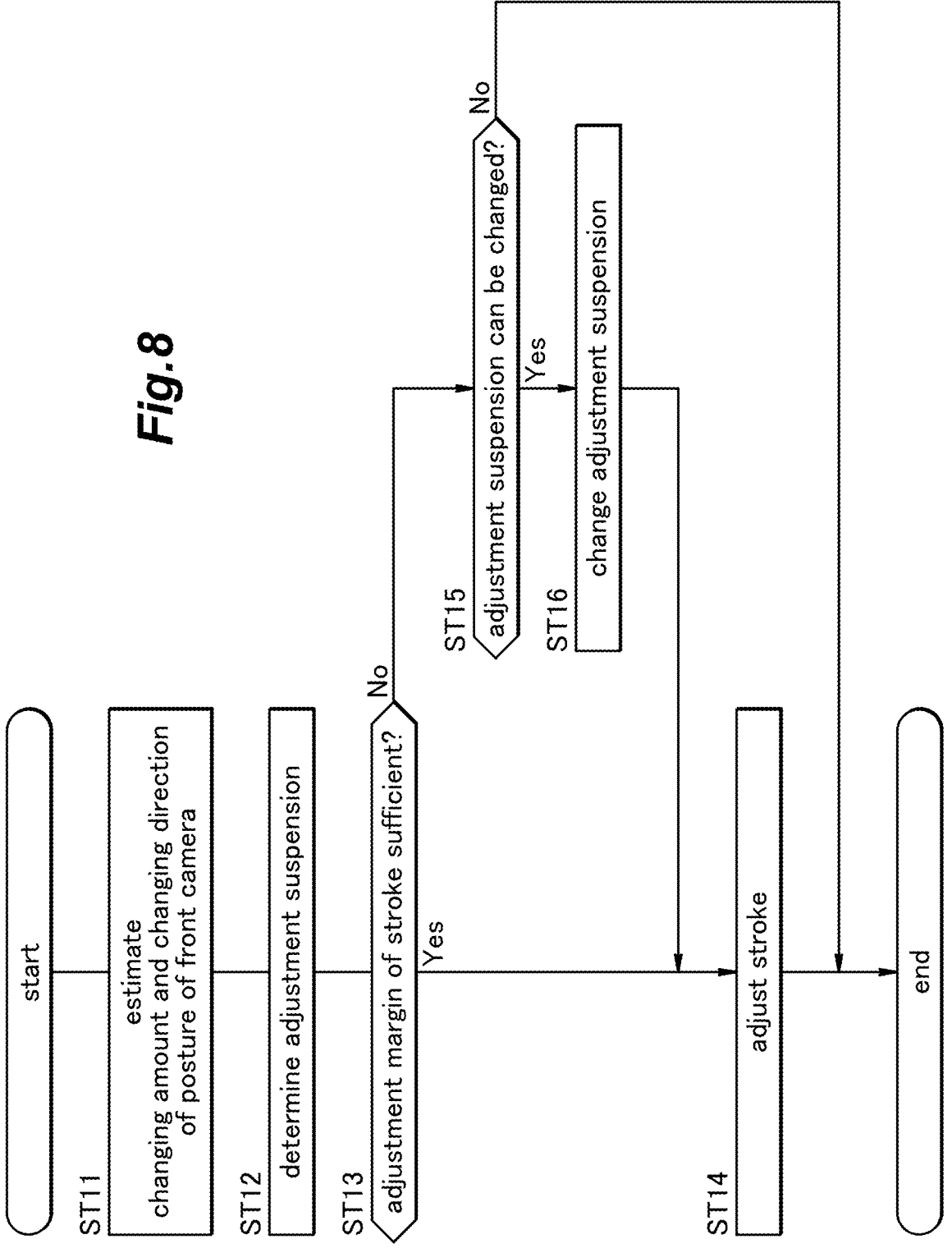
FIG. 8 is a flowchart showing the posture correction processing according to the first embodiment.

With reference to FIG. 8, when the posture correction processing is started, the controller 17 estimates a changing amount and a changing direction of the posture of the front camera 8 based on the reference position Pr of the camera vanishing point 43 and the current position Pc of the camera vanishing point 43 (step ST11). For example, the controller 17 estimates the changing amount of the posture of the front camera 8 based on the distance from the reference position Pr of the camera vanishing point 43 to the current position Pc of the camera vanishing point 43. Further, the controller 17 estimates the changing direction of the posture of the front camera 8 based on the direction of the current position Pc of the camera vanishing point 43 relative to the reference position Pr of the camera vanishing point 43. The image formed on the image sensor of the front camera 8 is inverted vertically and horizontally relative to the real image. Accordingly, it is preferable that the controller 17 estimates the changing direction of the posture of the front camera 8 while taking such image inversion into consideration.

Next, the controller 17 determines the suspension 5 (hereinafter referred to as "the adjustment suspension 5") the stroke of which is to be adjusted based on the changing amount and the changing direction of the posture of the front camera 8, and also determines an adjustment amount and an adjustment direction of the stroke of the adjustment suspension 5 (step ST12).

Next, the controller 17 determines whether an adjustment margin of the stroke of the adjustment suspension 5 is sufficient (step ST13). In other words, the controller 17 determines whether the stroke of the adjustment suspension 5 can be adjusted in the adjustment direction by the adjustment amount.

In a case where the adjustment margin of the stroke of the adjustment suspension 5 is sufficient (step ST13: Yes), the controller 17 adjusts the stroke of the adjustment suspension 5 in the adjustment direction by the adjustment amount (step ST14). Accordingly, the posture of the vehicle body 2 relative to the road surface changes, and the posture of the front camera 8 is corrected. When the adjustment of the stroke of the adjustment suspension 5 ends, the posture correction processing ends.

In a case where the adjustment margin of the stroke of the adjustment suspension 5 is not sufficient (step ST13: No), the controller 17 determines whether the adjustment suspension 5 can be changed (step ST15). In other words, the controller 17 determines whether the posture of the front camera 8 can be corrected by the suspension 5 other than the adjustment suspension 5.

In a case where the adjustment suspension 5 cannot be changed (step ST15: No), the controller 17 ends the posture correction processing without correcting the posture of the front camera 8.

In a case where the adjustment suspension 5 can be changed (step ST15: Yes), the controller 17 changes the adjustment suspension 5, and determines the adjustment amount and the adjustment direction of the stroke of the adjustment suspension 5 after the change thereof (step ST16).

Next, the controller 17 adjusts the stroke of the adjustment suspension 5 in the adjustment direction by the adjustment amount (step ST14). When the adjustment of the stroke of the adjustment suspension 5 ends, the posture correction processing ends.

Further, in step ST14 of the posture correction processing, when the controller 17 adjusts the stroke of one or two suspensions 5 on one of the left and right sides, the posture of the front camera 8 is corrected in the roll direction of the vehicle 1 as the vehicle body 2 rotates around the roll axis of the vehicle 1. On the other hand, when the controller 17 adjusts the stroke of one or two suspensions 5 on one of the front and rear sides, the posture of the front camera 8 is corrected in the pitch direction of the vehicle 1 as the vehicle body 2 rotates around the pitch axis of the vehicle 1. In this way, the controller 17 can freely correct the posture of the front camera 8 in the roll direction and the pitch direction of the vehicle 1.

Effects

In the initial state of vehicle 1, the front camera 8 is in the reference posture, and the camera optical axis angle matches the reference angle. At this time, the optical axis of the front camera 8 is parallel to a reference direction (for example, a direction from the front camera 8 toward the point at infinity).

By contrast, when the posture of the front camera 8 changes from the reference posture due to the aging thereof, the external impact, and the like, a deviation occurs between the camera optical axis angle and the reference angle. If the front camera 8 captures the camera image 41 and the controller 17 recognizes the object based on the camera image 41 in a state where such a deviation occurs, the detection accuracy of a distance from the front camera 8 to the object may decrease or the range in which the object can be detected may become narrower, which may cause a decrease in the recognition performance of the object. As such, in the present embodiment, when the deviation occurs between the camera optical axis angle and the reference angle, the camera image processing or the posture correction processing is executed to cause the camera optical axis angle to match the reference angle. Accordingly, it is possible to improve the recognition performance of the object.

By the way, in a case where the deviation occurs between the camera optical axis angle and the reference angle, it might be possible to execute only the camera image processing without executing the posture correction processing. However, there is a limit on the correction of the deviation in the camera optical axis angle by the camera image processing. This is because the camera image processing only corrects the position of the camera vanishing point 43 within the camera image 41 captured from a prescribed mounting position (fixed point), and cannot move the position of the camera image 41 (see FIG. 7A). In particular, in a case where a portion of the image processing area 54 sticks out of the camera image 41 (see FIG. 6B), the portion of the image processing area 54 that sticks out of the camera image 41 cannot be used for recognizing the object. That is, in a case where a portion of the image processing area 54 sticks out of the camera image 41, the image processing area 54 may be narrowed in effect.

In contrast, in the posture correction processing, it is possible to move the camera image 41 together with the image processing area 54 by correcting the posture of the front camera 8 (see FIG. 7B). Accordingly, it is possible to always cause the image processing area 54 to fall within the camera image 41, and to use the whole of the image processing area 54 for recognizing the object. Accordingly, it is possible to improve the recognition performance of the object.

Second Embodiment

Figure 9:
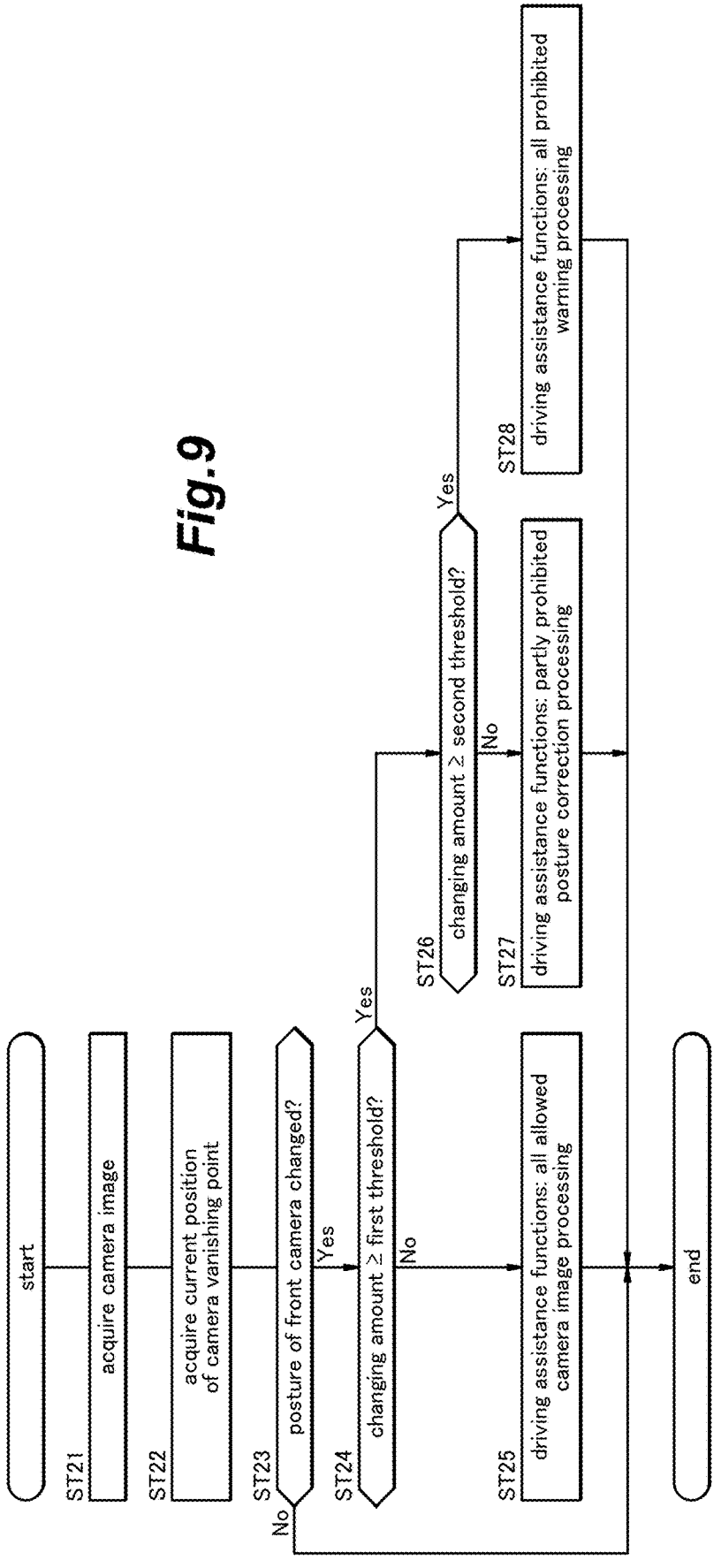
FIG. 9 is a flowchart showing optical axis angle correction control according to the second embodiment.

Next, with reference to FIG. 9, the second embodiment of the present invention will be described. The contents of the second embodiment except for the optical axis angle correction control executed by the controller 17 are similar to those of the first embodiment, and therefore the descriptions thereof will be omitted. Further, steps ST21 to ST23 of the optical axis angle correction control according to the second embodiment are similar to steps ST1 to ST3 of the optical axis angle correction control according to the first embodiment, and therefore the descriptions thereof will be omitted.
<Optical Axis Angle Correction Control>

In a case where the posture of the front camera 8 has changed from the reference posture (step ST23: Yes), the controller 17 determines whether the changing amount of the posture of the front camera 8 is equal to or greater than a first threshold (step ST24). For example, in a case where the distance from the reference position Pr of the camera vanishing point 43 to the current position Pc of the camera vanishing point 43 is equal to or greater than a first distance, the controller 17 determines that the changing amount of the posture of the front camera 8 is equal to or greater than the first threshold. By contrast, in a case where the distance from the reference position Pr of the camera vanishing point 43 to the current position Pc of the camera vanishing point 43 is less than the first distance, the controller 17 determines that the changing amount of the posture of the front camera 8 is less than the first threshold.

In a case where the changing amount of the posture of the front camera 8 is less than the first threshold (step ST24: No), the controller 17 allows the performance of all of the driving assistance functions and executes the camera image processing (step ST25). The camera image processing of the second embodiment is similar to that of the first embodiment, and therefore the descriptions thereof will be omitted.

In a case where the changing amount of the posture of the front camera 8 is equal to or greater than the first threshold (step ST24: Yes), the controller 17 determines whether the changing amount of the posture of the front camera 8 is equal to or greater than a second threshold that is greater than the first threshold (step ST26). For example, in a case where the distance from the reference position Pr of the camera vanishing point 43 to the current position Pc of the camera vanishing point 43 is equal to or greater than a second distance that is greater than the first distance, the controller 17 determines that the changing amount of the posture of the front camera 8 is equal to or greater than the second threshold. By contrast, in a case where the distance from the reference position Pr of the camera vanishing point 43 to the current position Pc of the camera vanishing point 43 is less than the second distance, the controller 17 determines that the changing amount of the posture of the front camera 8 is less than the second threshold.

In a case where the changing amount of the posture of the front camera 8 is less than the second threshold (step ST26: No), the controller 17 prohibits the performance of a part of the driving assistance functions and executes the posture correction processing (step ST27). For example, the controller 17 prohibits the performance of the lane changing function in a case where the vehicle speed is equal to or greater than a prescribed reference speed or in a case where the friction coefficient of the road surface is less than a prescribed reference value. The posture correction processing of the second embodiment is similar to that of the first embodiment, and therefore the descriptions thereof will be omitted.

In a case where the changing amount of the posture of the front camera 8 is equal to or greater than the second threshold (step ST26: Yes), the controller 17 prohibits the performance of all of the driving assistance functions and executes warning processing (step ST28). In the warning processing, the controller 17 causes the HMI 14 to output warning information. For example, the touch panel of the HMI 14 displays, as the warning information, a warning message that prompts the inspection of the vehicle 1.

Modifications

In the above embodiments, the controller 17 determines whether the posture of the front camera 8 has changed based on the camera vanishing point 43. In another embodiment, the controller 17 may determine whether the posture of the front camera 8 has changed based on information other than the camera vanishing point 43 (for example, the camera optical axis angle).

In the above embodiments, the controller 17 estimates the changing amount and the changing direction of the posture of the front camera 8 based on the camera vanishing point 43. In another embodiment, the controller 17 may estimate the changing amount and the changing direction of the posture of the front camera 8 based on information other than the camera vanishing point 43 (for example, the camera optical axis angle).

In the above embodiments, the controller 17 acquires the reference position Pr of the camera vanishing point 43 in the initial state (for example, the state at the time of shipment) of the vehicle 1. In another embodiment, the controller 17 may acquire the reference position Pr of the camera vanishing point 43 after the use of the vehicle 1 is started. For example, in a case where the vanishing point acquisition processing is repeated regularly, the controller 17 may set the camera vanishing point 43 acquired by the previous vanishing point acquisition processing as the reference position Pr of the camera vanishing point 43.

In the above embodiments, the suspension 5 is composed of an air suspension. In another embodiment, the suspension 5 may be composed of a device other than an air suspension (for example, a hydraulic suspension).

In the above embodiments, the front camera 8 is used as an example of the imaging device. In another embodiment, a camera other than the front camera 8 (for example, a side camera or a rear camera) may be used as an example of the imaging device.

In the above embodiments, the vehicle 1 is an off-road automobile. In another embodiment, the vehicle 1 may be an automobile other than an off-road automobile, or may be a wheeled vehicle other than an automobile.

Concrete embodiments of the present invention have been described in the foregoing, but the present invention should not be limited by the foregoing embodiments and various modifications and alterations are possible within the scope of the present invention.

The invention claimed is:
1. A vehicle, comprising:
a posture adjustment device connected to a wheel and configured to change a posture of a vehicle body relative to a road surface;

an imaging device attached to the vehicle body and configured to capture an image of an external environment; and a controller configured to control the posture adjustment device and the imaging device, wherein the controller is configured to acquire a current position of a vanishing point in the image captured by the imaging device, determine whether a posture of the imaging device has changed, and correct the posture of the imaging device by causing the posture adjustment device to change the posture of the vehicle body in a case where the posture of the imaging device has changed and an image processing area around the current position of the vanishing point does not fall within an imaging range of the imaging device.

2. The vehicle according to claim 1, wherein the controller is configured to correct a position of the vanishing point by executing image processing on the image captured by the imaging device in a case where the posture of the imaging device has changed and the image processing area falls within the imaging range of the imaging device.

3. The vehicle according to claim 1, wherein the controller is configured to correct the posture of the imaging device by causing the posture adjustment device to change the posture of the vehicle body in a case where the posture of the imaging device has changed and a changing amount of the posture of the imaging device is equal to or greater than a first threshold.

4. The vehicle according to claim 3, wherein the controller is configured to correct a position of the vanishing point in the image captured by the imaging device by executing image processing on the image captured by the imaging device in a case where the posture of the imaging device has changed and the changing amount of the posture of the imaging device is less than the first threshold.

5. The vehicle according to claim 3, further comprising an output device configured to output information to an occupant, wherein the controller is configured to cause the output device to output warning information in a case where the posture of the imaging device has changed and the changing amount of the posture of the imaging device is equal to or greater than a second threshold that is greater than the first threshold.

6. The vehicle according to claim 1, wherein the controller is configured to store a reference position of the vanishing point in the image captured by the imaging device, acquire the current position of the vanishing point in the image captured by the imaging device, and determine that the posture of the imaging device has changed in a case where the current position of the vanishing point does not match the reference position of the vanishing point.

7. The vehicle according to claim 1, wherein the controller is configured to store a reference position of the vanishing point in the image captured by the imaging device, acquire the current position of the vanishing point in the image captured by the imaging device, and estimate a changing amount and a changing direction of the posture of the imaging device based on the reference position of the vanishing point and the current position of the vanishing point.

8. The vehicle according to claim 1, wherein the posture adjustment device is a suspension arranged between the wheel and the vehicle body, and the suspension is configured to change the posture of the vehicle body by raising and lowering a portion of the vehicle body relative to the wheel.

9. A vehicle, comprising:

a posture adjustment device connected to a wheel and configured to change a posture of a vehicle body relative to a road surface;

an imaging device attached to the vehicle body and configured to capture an image of an external environment; and a controller configured to control the posture adjustment device and the imaging device, wherein the controller is configured to determine whether a posture of the imaging device has changed, and correct the posture of the imaging device by causing the posture adjustment device to change the posture of the vehicle body in a case where the posture of the imaging device has changed, wherein the controller is configured to correct the posture of the imaging device by causing the posture adjustment device to change the posture of the vehicle body in a case where the posture of the imaging device has changed and a changing amount of the posture of the imaging device is equal to or greater than a first threshold, wherein the vehicle further comprises an output device configured to output information to an occupant, wherein the controller is configured to cause the output device to output warning information in a case where the posture of the imaging device has changed and the changing amount of the posture of the imaging device is equal to or greater than a second threshold that is greater than the first threshold, wherein the controller is configured to perform a plurality of driving assistance functions based on the image captured by the imaging device, allow performance of all of the driving assistance functions in a case where the posture of the imaging device has changed and the changing amount of the posture of the imaging device is less than the first threshold, prohibit performance of a part of the driving assistance functions in a case where the posture of the imaging device has changed and the changing amount of the posture of the imaging device is equal to or greater than the first threshold and less than the second threshold, and prohibit performance of all of the driving assistance functions in a case where the posture of the imaging device has changed and the changing amount of the posture of the imaging device is equal to or greater than the second threshold.

* * * * *